No. 729,366. Patented May 26, 1903.

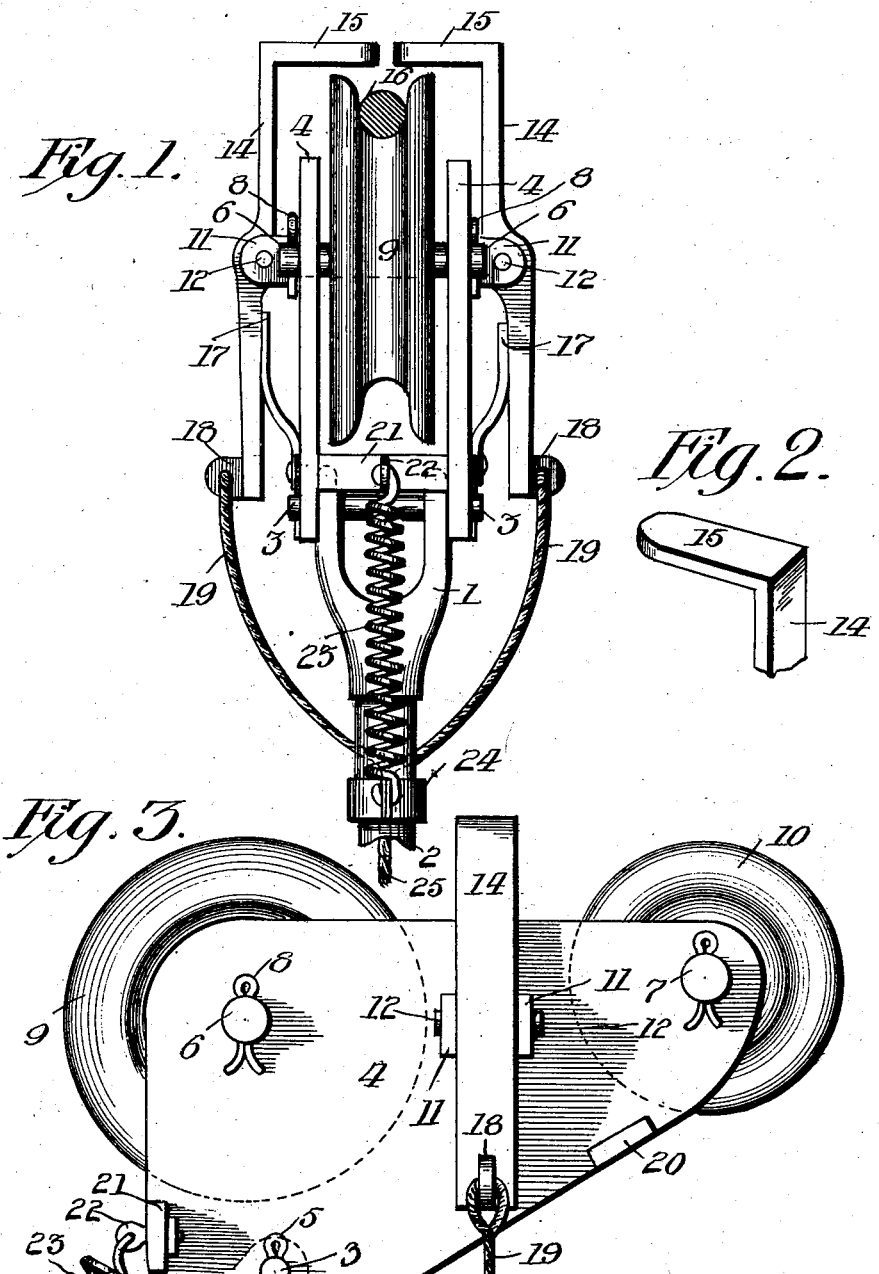

UNITED STATES PATENT OFFICE.

FREDERICK LEHRMANN, OF TURTLECREEK, PENNSYLVANIA.

TROLLEY.

SPECIFICATION forming part of Letters Patent No. 729,366, dated May 26, 1903.

Application filed April 2, 1903. Serial No. 150,774. (No model.)

*To all whom it may concern:*

Be it known that I, FREDERICK LEHRMANN, a citizen of the United States of America, residing at Turtlecreek, in the county of Allegheny and State of Pennsylvania, have invented certain new and useful Improvements in Trolleys, of which the following is a specification, reference being had therein to the accompanying drawings.

This invention relates to certain new and useful improvements in trolleys, the object of the invention being to provide means for normally holding the trolley in engagement with the wire and preventing the accidental displacement thereof by reason of the trolley rounding a curve or by reason of vibration imparted to the trolley-pole.

Briefly described, my invention comprises, in connection with the trolley-harp, a pair of side plates mounted on the axle or journal-pin carried by the harp, these side plates being substantially triangular in section and having journaled therein, near each of the upper corners, axles or journal-pins upon which are mounted trolley-wheels for engagement with the current-wire. These trolley-wheels are mounted in tandem form, the first or front wheel being of a considerably greater diameter than the rear wheel and the rear wheel being held up against the wire by means of a spring connected to the front of the frame carrying the wheels and to the trolley-pole. Spring-pressed arms are pivoted to the triangular-shaped side plates and are turned inwardly at their upper end toward each other, so as to lie normally over the current-wire and act as guards. Means is connected to these guards whereby they are retracted to permit the removal of the trolley-wheel from the wire or the placing of the same in position on the wire.

In describing the invention in detail reference is had to the accompanying drawings, forming a part of this specification, and wherein like numerals of reference indicate like parts throughout the several views, in which—

Figure 1 is a front elevation of my improved trolley, showing same in position on the trolley or current wire. Fig. 2 is a detail perspective view of one of the guard-arms. Fig. 3 is a side elevation of the trolley with the harp broken away.

To put my invention into practice, I provide a harp 1, which is suitably secured to the trolley-pole 2. Mounted in the prongs of this harp, near the upper end thereof, is an axle or journal-pin 3, the ends of which extend beyond the sides of the prongs and have mounted thereon the substantially triangular-shaped side plates 4, held in position on the axle or journal-pin by cotter-pins 5 or other suitable means. Mounted in these side plates 4, near each upper corner thereof, are the axles or journal-pins 6 7, respectively, which are held against longitudinal movement by cotter-pins 8 or other suitable means. Mounted on these axles 6 and 7 are the trolley-engaging wheels 9 and 10, the former being of considerably greater diameter than the rear or trailer wheel, these two wheels being mounted tandem or in alinement with each other. On the outer face of each of the side plates 4 is a pair of lugs 11, between which is pivotally mounted, by means of the pivot-pin 12, a pair of guard-arms 14, which extend upwardly above the upper edge of the side plates and have their inner ends 15 extended inwardly toward each other a distance whereby to leave a space between the arms less than the diameter of the current or trolley wire 16. These guard-arms are normally held in position (shown in Fig. 1) by means of springs 17, attached to the side plates and bearing against the inner face of the guard-arms 14 below the pivotal points of said arms. At their lower ends the said arms carry apertured lugs 18, to which are fastened the ends of the operating-cord 19. The side plates are braced by means of cross-bars 20 and 21, the latter carrying the eyebolt 22, to which is attached the upper end of the spring 23, the lower end of said spring being connected to the clip 24, mounted on the trolley-pole.

When it is desired to place the trolley in position on the wire, a pull on the operating-cord 25 causes the ends 19 of said cord to pull the lower ends of the arms 14 toward each other, thus spreading the upper end of the arms, whereby the trolley may be readily engaged with the wire. The spring 23 is made of such tension as to pull downwardly on the front ends of the plates 4, whereby to hold the trolley-wheel 10 in alinement with the trolley-wheel 9 and in engagement with the trolley-wire at the same time as the trolley-wheel 9 is engaging the wire. The additional protection of the two wheels engaging the wire, in addition to the protection afforded by the guard-arms, is therefore provided.

It will be observed that various changes may be made in the details of construction without departing from the general spirit of my invention.

Having fully described my invention, what I claim as new, and desire to secure by Letters Patent, is—

In a trolley, the combination with a harp carrying an axle having its ends extending beyond the sides of the harp, of a pair of substantially triangular-shaped side plates mounted on the extended ends of said axle, a pair of axles journaled in said side plates near the upper corners thereof, trolley-wheels mounted on said axles, said wheels being of different diameters, a pair of spring-pressed guard-arms pivotally connected to the outer faces of the side plates and having their upper ends bent inwardly, a cross-bar connecting the front edge of the side plates, and a spring connected to said cross-bar and to the trolley-pole for holding the rear trolley-wheel in engagement with the trolley-wire, substantially as described.

In testimony whereof I affix my signature in the presence of two witnesses.

FREDERICK LEHRMANN.

Witnesses:
H. C. EVERT,
A. M. WILSON.